Patented Nov. 9, 1948

2,453,520

UNITED STATES PATENT OFFICE 2,453,520

ORGANIC TITANIUM COMPOUND AND METHOD OF MAKING SAME

Carl Martin Langkammerer, Wilmington, Del., assignor to E. I. du Pont de Nemours & Company, Wilmington, Del., a corporation of Delaware No Drawing. Application September 28, 1946, Serial No. 700,158

3 Claims. (Cl. 260—429)

This invention relates to the production of novel organic titanium compounds, and to useful processes for their preparation. More particularly, it relates to the production of relatively pure, stable, water-soluble, organic compounds of titanium from the reaction of regulated amounts of hydrated titanium oxide and aliphatic alpha-hydroxy monocarboxylic acids.

It is among the objects of this invention to provide new, water-soluble, organic titanium compounds which are stable to hydrolysis. A further object is to provide a novel process for preparing pure forms of such compounds of titanium. A still further object is to provide new and useful modifiers for synthetic resins, particularly those containing a plurality of hydroxyl groups. Other objects and advantages of the invention will be apparent from the ensuing description thereof.

The foregoing and other objects are accomplished in this invention which comprises reacting an aliphatic alphahydroxy monocarboxylic acid containing not more than 7 carbon atoms with two molecular equivalents of a hydrated titanium dioxide such as ortho-titanic acid or hydrous titanium dioxide.

In a more specific and preferred embodiment, the invention comprises heating hydroxyacetic acid with two molecular equivalents of a hydrated $TiO_2$ precipitate until a clear solution results and then evaporating the resulting solution to dryness to recover the water-soluble organic titanium compound having the formula

$CH_2OHCOOH.2Ti(OH)_4$

Complexes of alpha-hydroxy acids and hydrated titanium having a ratio of one or more mols of alpha-hydroxy acid to one mol of titanium dioxide are already known. They are considered to be a chelate type of complex in which one mol of alpha-hydroxy acid is combined with one of hydrated titanium dioxide and precipitate when alcohol is added to their aqueous solutions. Accordingly, it was surprising to discover that a water-soluble complex could be prepared having a ratio of two mols of titanium dioxide for one mol of alpha-hydroxy monocarboxylic acid, either directly by heating one mol of an alpha-monohydroxy acid of certain type with two mols of hydrous titanium dioxide in water or by removal of hydroxyacetic acid from a solution containing a higher molar ratio of alpha-hydroxy monocarboxylic acid to hydrous titanium dioxide.

The compounds of this invention must contain approximately two mols of $TiO_2$ for each mol of alpha-hydroxy monocarboxylic acid. They are soluble in water and insoluble in organic solvents, such as ethanol, benzene, chloroform, ether, acetone, and the like, and are represented by the general formula $RCHOHCOOH.2TiO_2.XH_2O$, wherein R is an alkyl radical containing not more than 7 carbon atoms and $XH_2O$ represents water of hydration, X being an integer from 1 to 4.

The products of this invention are useful as modifiers for polyhydroxy materials such as polyvinyl alcohol, starch, hydroxyethyl cellulose, and the like. In general, they render materials of this type less water-sensitive. They are also useful as screening agents for ultraviolet light and as titanating agents, due to the fact that in the latter applications they more readily yield their titanium content to more easily titanated hydroxy compounds.

To a clearer understanding of the invention, the following examples in which parts are by weight, are given. These are merely illustrative and not to be construed as in limitation of the invention.

Example I

Hydrous titanium dioxide was prepared by reacting 379.5 parts of titanium tetrachloride with 1,540 parts of ice and water to give a clear solution. This was agitated vigorously in a reaction vessel and 2600 parts of 7% aqueous ammonia was added slowly with external cooling to give a suspension having a pH of 9. The solid was filtered and reslurried in distilled water. This operation was carried out several times until the wash water was free of chloride ions. The resulting product after the last filtration contained 14.2% titanium dioxide, the rest being water of hydration and water held by the precipitated solid. One thousand one hundred and twenty parts of this solid were heated at 90° C. with 76 parts of hydroxyacetic acid. At the end of four hours, a clear solution resulted which was stable indefinitely. On evaporation of this solution to dryness, a white solid was obtained which gave analytical values for titanium which corresponded very closely to those required for the formula $CH_2OHCOOH.2Ti(OH)_4$. This solid was soluble in water and insoluble in organic solvents.

Example II

A solution of the reaction product of one mol of hydrous titanium dioxide with one mol of hydroxyacetic acid was prepared in a manner similar to that described in the above example. This was agitated with 70 parts of a commercial amine-aldehyde anion exchange resin for 15 minutes. The spent-ion exchange resin was filtered off and the filtrate treated with another 16 parts of fresh resin for one-half hour and then filtered. The resulting filtrate was evaporated to dryness. The product corresponded roughly to the formula $CH_2OHCOOH.2TiO_2.H_2O$; analysis: calculated for $C_2H_6Ti_2O_8$: $C=9.4\%$; $H$, $2.37\%$; $O$, $62.9\%$. Found: C, 8.0%; H, 2.5%; $TiO_2$, 63.1%.

The present process comprises dissolving hydrated titanium dioxide in an alpha-hydroxy monocarboxylic acid and enables one to obtain a pure titanium organic compound which is free from the objectionable electrolytes or inorganic salts, such as sodium chloride, sodium sulfate, and the like, which are ordinarily present in the final compound if the titanium salt solution is added to the hydroxy acid or its salts and with or without the presence of a neutralizing agent to combine with the acid of the titanium salt solution which is used.

While the invention has been described as applied to certain preferred and specific embodiments, it obviously is not limited thereto and suitable variance therefrom may be had without departing from its underlying principles and scope. Thus, although my novel product may be obtained either by directly heating 1 mol of the contemplated hydroxy acid with 2 mols of hydrous $TiO_2$ in water or by removal of hydroxy acetic acid from a solution containing a higher molar ratio of the alpha-hydroxy monocarboxylic acid to hydrous $TiO_2$, the product may also be obtained by adding an organic solvent to the $TiO_2$ water-containing solution and ultimately obtain the desired dry end product. Thus, ethanol or acetone may be added to the water solution to alter the nature of the solvent and when such alteration is effected, precipitation of the desired titanium compound will then occur, which compound can then be recovered in a conventional manner. Similarly, although certain aliphatic hydroxy monocarboxylic acids have been mentioned as utilizable herein, other forms of such acids, including hydroxy acetic acid, lactic acid, alpha-hydroxy butyric acid, alpha-hydroxy propionic acid, alpha-hydroxy pentanoic acid, alpha-hydroxy heptanoic acid, and alpha-hydroxy hexanoic acid, can be used, none of which acids contains more than 7 carbon atoms in its chain. Similarly, though specific temperatures and heating times have been mentioned, these are not critical to the invention since, if desired, the solution may be maintained at 100° C. for several hours or desired reaction effected by maintaining the reaction solution at room temperatures for several weeks.

The titanium dioxide employed herein must be in hydrated form and may comprise orthotitanic acid or any higher hydrate of titanium. These hydrates can be readily obtained by neutralizing a titanium salt solution, such as a sulfate, chloride, nitrate, etc., with sufficient alkali (sodium or potassium hydroxide) to precipitate the desired orthotitanic acid. Alternatively, the $TiO_2$ hydrate may comprise the hydrolysate recovered through hydrolytic precipitation of a titanium salt solution of the type mentioned and in accordance, for instance, with the procedures described in U. S. Reissue Patents 18,854 and 18,790, or in U. S. Patent 2,062,133. The hydrate may be used as a paste containing extra water or may be employed in the dry state as a powder.

I claim as my inventon:

1. A method for producing a water-soluble, electrolyte-free organic compound of titanium which comprises dissolving in hydroxy acetic acid 2 molecular equivalents of a $TiO_2$ hydrate to obtain a clear solution and then evaporating said solution to dryness to recover said titanium compound.

2. A method for producing a pure, stable, water-soluble, organic compound of titanium free from electrolytes, which comprises heating hydroxy acetic acid with 2 molecular equivalents of a hydrated $TiO_2$ precipitate until a clear solution results, and then evaporating the resulting solution to dryness to recover the organic titanium compound.

3. A water-soluble, organic titanium compound having the formula $CH_2OHCOOH.2Ti(OH)_4$, said compound being electrolyte-free and insoluble in organic solvents.

CARL MARTIN LANGKAMMERER.

REFERENCES CITED

The following references are of record in the file of this patent:

UNITED STATES PATENTS

| Number | Name | Date |
|---|---|---|
| 760,319 | Dreher | May 17, 1904 |
| 1,059,740 | Liebknecht | Apr. 22, 1913 |
| 2,316,141 | Warner | Apr. 6, 1943 |

FOREIGN PATENTS

| Number | Country | Date |
|---|---|---|
| 256,858 | Germany | Feb. 21, 1913 |

OTHER REFERENCES

Fenton, Jour. Chem. Soc., (London), vol. 93, pages 1064–1069 (1908).

Rosenheim, Zeit, Anorg. Chem., vol. 26, pages 254, 257 (1901).

Berg, Zeit, Anorg. Chem., vol 15, pages 328-330 (1897).